July 14, 1959
J. C. SULLIVAN ET AL  2,894,807
CATION EXCHANGE METHOD FOR THE RECOVERY OF PROTACTINIUM
Filed April 30, 1951
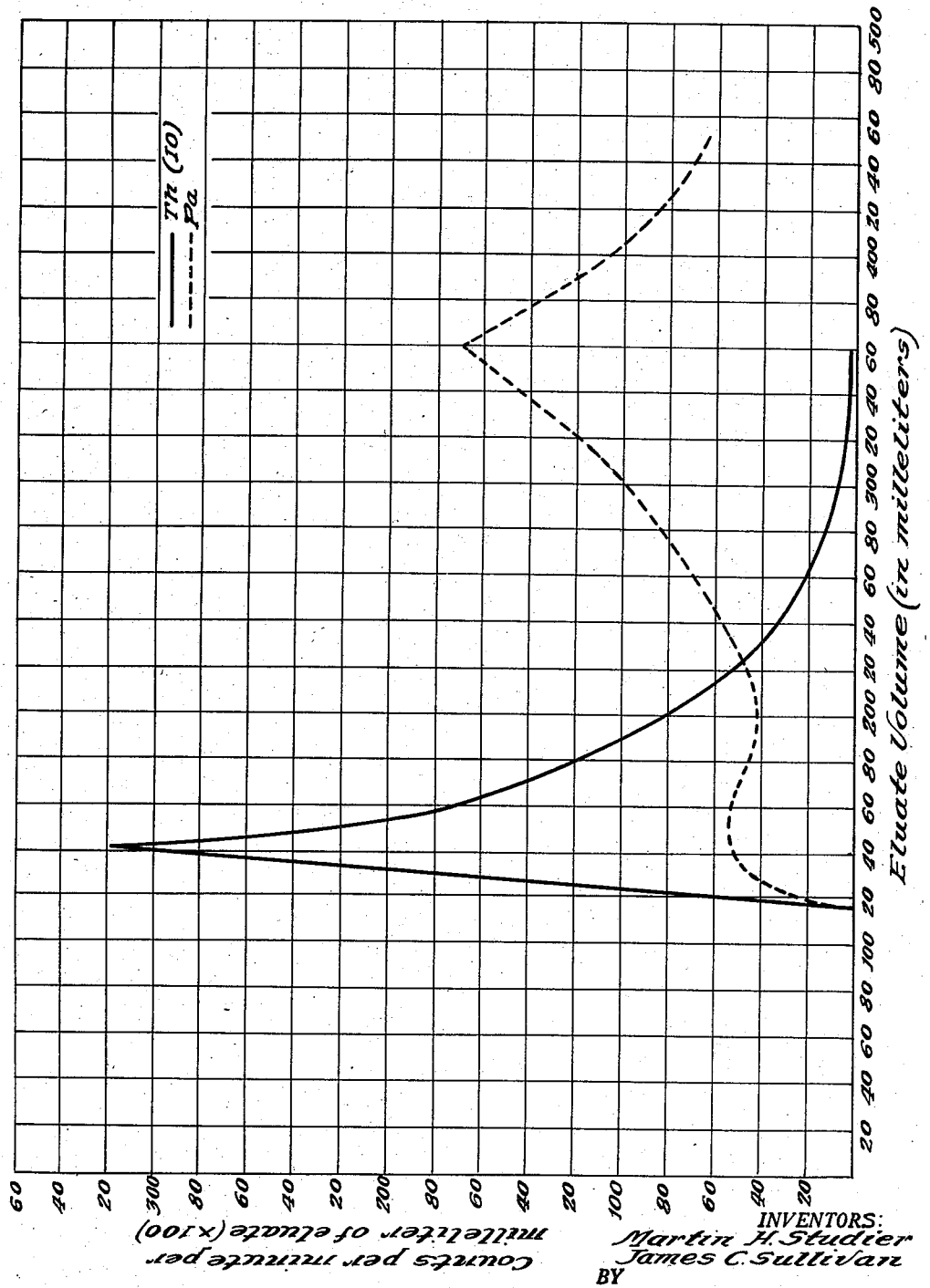
INVENTORS:
Martin H. Studier
James C. Sullivan
BY
Roland A. Anderson
Attorney United States Patent Office 2,894,807
Patented July 14, 1959

2,894,807
CATION EXCHANGE METHOD FOR THE RECOVERY OF PROTACTINIUM

James C. Sullivan and Martin H. Studier, Chicago, Ill., assignors to the United States of America as represented by the United States Atomic Energy Commission Application April 30, 1951, Serial No. 223,744

3 Claims. (Cl. 23—14.5)

The present invention is concerned with the recovery of protactinium from dilute solutions and more particularly with the recovery of protactinium from mixtures of protactinium with other actinide rare earth elements.

Protactinium is found naturally associated with other members of the actinide rare earth series such as thorium and uranium. The naturally-occurring protactinium is always found in very minute concentrations even in comparison with the rare associated elements, thorium and uranium. The predominant naturally-occurring protactinium isotope is $Pa^{231}$, a member of the $4n+3$ radioactive series. The isotope is usually found associated with $Th^{231}$ and $U^{235}$. Another naturally-occurring protactinium isotope is $Pa^{234}$ which is always found associated with $Th^{234}$ and $Th^{230}$. There are numerous artificially produced protactinium isotopes which may be formed by the irradiation of actinide elements of lower mass number or by the radioactive decay of artificially produced actinide elements of higher mass number but these also are always produced in relatively low concentrations. It will be apparent from the foregoing description that the recovery of either naturally occurring or artificially produced protactinium from contaminants is always complicated by the low concentration of the protactinium and the relatively large concentrations of contaminating actinide rare earth elements.

It is an object of the present invention to provide an efficient method for the recovery of protactinium values from an aqueous solution.

An additional object of the present invention is to provide an efficient method for the recovery of protactinium values from a mixture of protactinium values and thorium values.

A further object of the present invention is to provide a method for the recovery of protactinium from mixtures of minute amounts of protactinium values and macro amounts of other actinide rare earth elements.

Still other objects will be apparent from the following detailed description.

It has been found that by the process of this invention protactinium may be quantitatively separated from thorium and other actinide rare earth elements even when the protactinium is present in concentrations exceedingly minute in comparison with the concentrations of the other actinide elements. The process depends upon the selective elution of thorium and other actinide earth elements from a cation exchange resin column containing adsorbed values of protactinium and of other actinide elements. Broadly, the process comprises the adsorption of the protactinium and other actinide earth elements upon a cation exchange resin column followed by selective elution of the thorium and actinide earth elements other than protactinium with an eluant comprising a sulfate solution having a pH of approximately 2–4. Following the elution of all other actinide elements, the protactinium is then removed from the resin. This is accomplished preferably either by the continued passage through the column of the original eluant or by the passage through the column of an eluant more specific to protactinium.

A preferred embodiment of the present invention is concerned with the recovery of protactinium from thorium. Such an embodiment may be applied to the recovery of any protactinium isotope from any thorium isotope. In this embodiment a dilute aqueous acidic mineral acid solution containing the mixture of thorium and protactinium values which are to be separated is first prepared. The hydrogen ion concentration of the solution should not be greater than about 6 or 8 N because of the tendency of protactinium to form an anion complex at higher acidities nor should it be less than about 0.1 N. The preferred medium is a 0.1–2.0 M nitric acid or hydrochloric acid solution. The thorium concentration of the solution should not be too high and ordinarily is maintained between about 0.05 and 1 M. It may, however, be much lower. The protactinium concentration should also be limited so that it does not exceed about 1 M. In most cases, of course, the protactinium concentration will be very small.

The cation exchanges resins which are especially suitable for employment in the present process are of the nuclear sulfonic type. Materials of this class may be made by copolymerizing styrene with divinylbenzene and sulfonating the resulting copolymer. A characteristic method of producing this type of resin is described by D'Alelio in U.S. Patent 2,366,007. Suitable examples of this type of resin are "Amberlite IR–120" and "Nalcite HCR."

The cationic species to be separated are normally adsorbed on the resin by passing a dilute mineral acid solution containing the cationic species through a column containing the resin. The cationic species may, however, be adsorbed on a much smaller quantity of resin by a batch method and the resin containing the adsorbed cations then placed at the top of a column of the resin. Both methods will be illustrated by examples disclosed in the present specification.

The essence of the present invention lies in the selective desorption of the thorium (and other actinide elements, if present) from the resin while desorbing a minimum amount of the protactinium. This may be accomplished by eluting the thorium with a mildly acidic solution containing sulfate ion. The pH of the eluant is critical and must lie between about 2 and 4 in order to achieve an effective separation. A preferred pH range for the eluant lies between 3 and 4 and the most efficient separations have been achieved with an eluant having a pH of 3.4. The sulfate concentration may be obtained by the dissolution of any soluble sulfate but is preferably obtained in the eluant by the dissolution of a weak base sulfate such as ammonium sulfate since the weak base cation will act as a buffer to help maintain the pH at a constant level. The sulfate concentration is not as critical as the pH and where ammonium sulfate is used, the molarity of the salt in the solution may lie between 0.1 and 1 M. It has been found that the more basic the solution within the ranges given the slower are the rates of thorium and of protactinium removal. However, at the preferred pH the thorium may be removed substantially quantitatively without removal of any substantial amount of protactinium.

Following the selective removal of the thorium from the resin, the protactinium may be recovered from the resin either by continued passage of the solution used to remove the thorium or by the passage of an eluting solution more specific to protactinium. The choice of methods of removing the protactinium will depend upon the conditions. If the thorium is entirely removed from the resin, the protactinium may be most efficiently removed by using an oxalate solution wherein the oxalate ion is present in a concentration of between about 0.1 and 0.4 M and preferably 0.2 M. The reason that it is preferable to employ this oxalate solution only after the thorium is entirely removed is because a thorium oxalate precipitate will form on the resin if any protactinion remains. Another suitable eluant for the protactinium is a concentrated mineral acid solution such as 6–10 N hydrochloric acid. This eluant may be used even though some thorium remains on the resin. Another suitable eluant when some thorium remains on the resin is a sulfate solution which is more acidic than the thorium eluate previously used for the selective removal of the thorium values from the resin. Other known protactinium elution agents may be employed without departing from the scope of this invention.

Under ideal conditions, greater than 98% separation of protactinium and thorium may be achieved in a single cycle by employment of the process of this invention. More than one cycle may, of course, be employed to achieve maximum separation. Now that this modification of the process of this invention has been broadly described, the following specific application will further illustrate this modification.

EXAMPLE I

A resin column was prepared containing 10 g. of "Dowex 50," a nuclear sulfonic, styrene base, cation exchange resin of the type described above. The resin had been air-dried before weighing and was of 120–150 mesh size. Two grams of the air-dried resin were separately equilibrated with a solution consisting of 5 cc. of 2 N nitric acid, 0.5 cc. of 0.114 M thorium nitrate solution, the thorium of which had been neutron-irradiated so that the solution contained $8.1 \times 10^5$ $\beta$ counts/min. of $Pa^{233}$, and 0.25 cc. of an ionium tracer solution containing $4.05 \times 10^5$ $\alpha$ counts/min. of $Th^{230}$ (ionium). Following equilibration the 2 g. of resin containing adsorbed thorium and protactinium values was placed on the top of the column of Dowex 50 resin. A sulfate solution 0.005 M in $H_2SO_4$ and 1 N in $(NH_4)_2SO_4$ having a pH of 3.15 was then passed through the column. Ten-microliter samples of the eluate stream were taken at intervals and analyzed for $\alpha$ and $\beta$ counts. The $\alpha$ counts furnish an indication of the thorium present and the $\beta$ counts an indication of the protactinium present. It will be noted that the sample was taken from the eluate stream and not from the total volume of eluate. The results obtained are shown in the table which follows and graphically in the figure.

Table

| Sample No. | Total Eluate at Time of Sample, ml. | Th(Io) Content of 10 µl. sample, α counts/min./10 µl. | Pa Content of 10 µl. sample, β counts/min./10 µl. |
|---|---|---|---|
| 1 | 116 | 0 | 0 |
| 2 | 142 | 318 | 53 |
| 3 | 152 | 242 | 53 |
| 4 | 166 | 142 | 51 |
| 5 | 178 | 130 | 43 |
| 6 | 216 | 62 | 47 |
| 7 | 234 | 38 | 50 |
| 8 | 243 | 18 | 57 |
| 9 | 272 | 12 | 67 |
| 10 | 360 | 2 | 168 |
| 11 | 386 | 0 | 123 |
| 12 | 410 | 0 | 92 |
| 13 | 452 | 0 | 62 |

A variant of the above method wherein substantially all of the thorium is first removed from the column with one eulant and the protactinium is then removed from the column with a second eluant specific to the protactinium is illustrated by the following example.

EXAMPLE II

Twenty grams of "Dowex 50" air-dried resin was inserted in a column 30 cm. long and having an inside diameter of 1 cm. The resin was then washed with a saturated aqueous solution of ammonium nitrate. A thorium-protactinium solution was then prepared by adding 500 µl. of ionium tracer and 500µl. of thorium nitrate solution containing tracer amounts of protactinium to approximately 40 ml. of 2 N nitric acid. The 500 µl. of ionium tracer solution contained approximately $1.76 \times 10^4$ $\alpha$ counts/min. of $Th^{230}$ and the 500 µl. thorium nitrate solution was prepared from thorium which had been neutron-irradiated so that the solution as prepared contained approximately $8.6 \times 10^8$ $\beta$ counts/min. of $Pa^{233}$. This solution was then passed through the column at a flow rate of approximately 0.05 ml./min. Following this adsorption step an elution solution of 0.2 M $(NH_4)_2SO_4$ which had been adjusted by adding $H_2SO_4$ so as to have a measured pH of 3.30 was passed through the column. Intermittent samples of the eluate were taken and analyzed for radioactivity. This analysis of the eluate showed that $\alpha$ activity commenced coming from the column after the passage of 123 ml. of eluate. The $\alpha$ activity in the eluate reached a peak after the passage of 336 ml. of eluate and gradually declined and finally completely disappeared after the passage of 1218 ml. Beta counts of protactinium values had not appeared in the eluate before the passage of 1122 ml. and only 2% of the protactinium present had been eluted at the time of complete disappearance of the $\alpha$ activity of the thorium from the eluate. Following the complete disappearance of $\alpha$ counts from the eluate after the passage of 1218 ml., an additional 300 ml. of the eluate was passed through the column to insure the removal of all thorium from the resin. The elution solution was then changed to 0.75 N oxalic acid and 400 ml. of this solution was passed through the column. This oxalic acid eluant quickly removed substantially all of the protactinium remaining in the column.

The process of the present invention is also particularly applicable to the separation of a mixture of uranium, thorium and protactinium values. An aqueous dilutely acid solution containing these three components may be used in the adsorption cycle. The uranium which is adsorbed on the resin is less tightly bound to the resin than thorium or protactinium and continued passage of a dilute acid solution such as 0.5 M hydrochloric acid or nitric acid will elute substantially all of the uranium without removing substantially any of the thorium or protactinium. The thorium may then be removed from the resin with a weak base sulfate solution, as shown in Examples I and II, and the protactinium finally removed from the resin by the steps previously disclosed.

An additional modification of the present invention is concerned with the separation of protactinium values from thorium values on the adsorption cycle. In this modification, a small quantity of the cation exchange resin is saturated with thorium values. An aqueous acidic solution containing a mixture of protactinium and thorium values is then passed through a column containing the thorium-saturated resin. We have found that protactinium from the solution will be adsorbed quantitatively on the thorium-saturated resin. The thorium contained in the solution will, of course, pass through the resin column without being adsorbed. The effluent from the adsorption cycle will therefore contain substantially all of the thorium values of the influent but substantially none of the protactinium values. Following passage of the adsorption cycle solution through the column, the thorium and protactinium values which are adsorbed on the column may be selectively desorbed as previously described thus resulting in substantially complete separation of thorium and protactinium.

It will be apparent to those skilled in the art that the method of separating protactinium from thorium as generally set forth above provides a simple and practical procedure for the procurement of a high degree of separation in a single step. It will be, of course, apparent to those skilled in the art that the degree of separation may be increased by carrying out additional cycles. While this invention has been illustrated by restricted applications thereof, it is not desired to be specifically limited thereto since it is manifest to those skilled in the art that the present invention is susceptible to numerous alterations and modifications without departing from the scope thereof. Changes therefore may be made without departing from the spirit and scope of the invention as described in the appended claims in which it is the intention to claim all novelty in the invention as broadly as possible.

What is claimed is:

1. The process of separating protactinium values from thorium values, which comprises passing an aqueous 0.1-2 N nitric acid solution containing protactinium and thorium values through a cation exchange column containing a nuclear sulfonic acid type cation exchange resin whereby substantially all of the thorium and protactinium values are adsorbed thereon, then passing through said column a quantity of 0.1-1 N ammonium sulfate solution having a pH of 3-4, sufficient to elute substantially all thorium values adsorbed thereon, and then passing a 0.1-0.4 M oxalate solution through the column whereby substantially all protactinium values adsorbed thereon are eluted.

2. The process of claim 1 wherein the eluant specific to protactinium is a 0.2 M oxalate solution.

3. The process of separating protactinium values from thorium values, which comprises passing an aqueous 0.1-2 N hydrochloric acid solution containing protactinium and thorium values through a cation exchange column containing a nuclear sulfonic acid type cation exchange resin whereby substantially all of the protactinium and thorium values are adsorbed thereon, then passing through said resin column a quantity of 0.1-1 N ammonium sulfate solution having a pH of 3.4 sufficient to elute substantially all of the thorium values adsorbed thereon, separately collecting the thorium-containing effluent, and then passing a 0.2 M oxalate solution through said column whereby the protactinium values are desorbed therefrom.

References Cited in the file of this patent

Tompkins et al.: "Journal of the American Chem. Soc.," vol. 69, pp. 2769-2777 (1947).

Thompson: "Studies on the Chem. of Protactinium," AECD-1897, declass. Apr. 15, 1948, 4 pages, U.S. Atomic Energy Comm., Oak Ridge.

Friedlander et al.: "Introduction to Radiochemistry," pp. 250-1 (1949), John Wiley & Sons, New York, N.Y.

Thompson: "Solubility of Protactinium in the Common Acids," AECD-2488, declass. Mar. 1, 1949, 4 pages.